S. M. VIALE.
ATTACHMENT OF ENGINE CYLINDERS TO CRANK CASES.
APPLICATION FILED MAY 25, 1921.

1,432,371. Patented Oct. 17, 1922.

INVENTOR
Spirito Mario Viale
PER
ATTORNEY.

Patented Oct. 17, 1922.

1,432,371

UNITED STATES PATENT OFFICE.

SPIRITO M. VIALE, OF COVENTRY, ENGLAND, ASSIGNOR TO ARMSTRONG SIDDELEY MOTORS LIMITED, OF COVENTRY, WARWICK, ENGLAND.

ATTACHMENT OF ENGINE CYLINDERS TO CRANK CASES.

Application filed May 25, 1921. Serial No. 472,464.

*To all whom it may concern:*

Be it known that I, SPIRITO MARIO VIALE, a subject of the King of Italy, residing at Coventry, in the county of Warwick, England, have invented certain new and useful Improvements in Attachment of Engine Cylinders to Crank Cases, of which the following is a specification.

This invention relates to means for attaching engine cylinders to crankcases, and is particularly applicable to the attachment of the separate cylinders of internal-combustion engines. It has for its object to avoid fixing the cylinder by studs or bolts and instead thereof to screw-thread the cylinder externally, and to provide light and simple co-operating means for securing it to the crankcase in such manner that it can be positioned with accuracy angularly about its axis, and also endwise thereof within permissible limits without risk of its becoming loose or being rotationally displaced in use.

According to this invention, the mouth of the cylinder enters a socket in the crankcase, and is there locked by a nut adapted to engage its threaded part and to bear also against the inner end of the socket, and this nut at any prearranged fraction of a turn thereof, can be locked to the crankcase, the cylinder thereafter being gripped against rotation and endwise displacement by the agency of a contractile split wedge ring, preferably of truncated wedge section, which is compressed radially between co-operating inclined surfaces formed around the external end of the socket, and a flange or shoulder around the body of the cylinder, thereby effectively preventing the cylinder unscrewing or moving endwise. A shoulder at the end of the threaded part of the cylinder is provided as an abutment for the end of the nut, thereby in conjunction with the engagement of the nut with the connecting end of the socket to locate the endwise position of the cylinder. If, when the nut is in contact with this shoulder, the angular position of the cylinder is incorrect, the whole cylinder, carrying with it the nut, can be rotated in the direction tending to screw it into the nut, (after the wedge ring has been slacked off), to the smallest angular position beyond the desired one at which the nut can be locked to the crankcase. The cylinder is then unscrewed relatively to the nut and brought to its desired angular position, when the wedge ring is gain clamped, and thereby the cylinder is securely locked in position.

The manner of carrying out the invention is illustrated in the accompanying drawings in which—

Like letters indicate like parts throughout the drawings.

Figure 1:
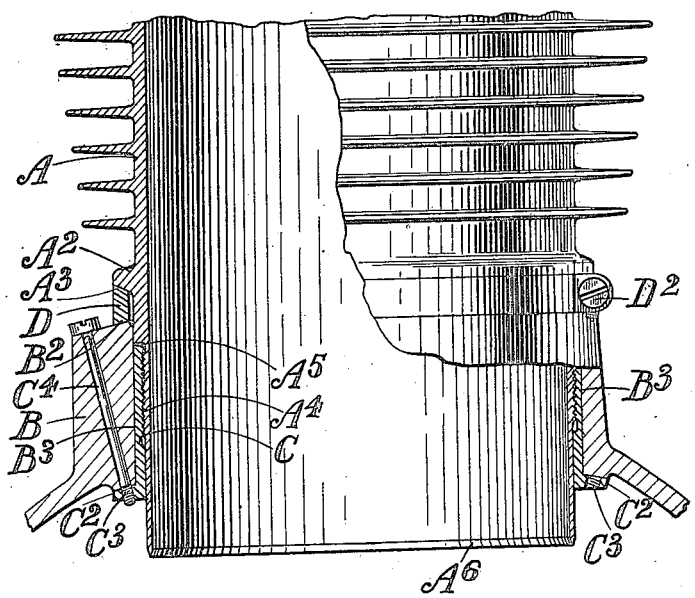
Figure 1 shows in section part of a crankcase and cylinder of an internal combustion engine to which the invention has been applied.
Figure 2:
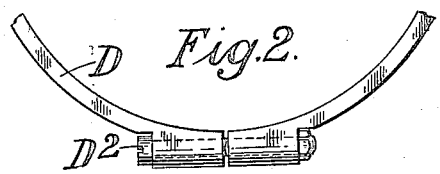
Figure 2 is a plan of part of the split ring.

The cylinder barrel A (indicated in the drawing as vertically arranged) has at an appropriate distance from the bottom end, a circumferential flange $A^2$ with a bevelled shoulder or face $A^3$, and a thread is formed at $A^4$ on the outer surface of the barrel between this flange and the cylinder mouth $A^6$.

A co-operating bevelled face $B^2$ is formed on the adjacent or top end of the crankcase socket B around the aperture $B^3$ therein which receives and supports the end of the cylinder barrel A. This socket is fitted with a loose sleeve C preferably of steel, which constitutes the nut above mentioned, and is internally threaded to screw upon the threaded part $A^4$ of the cylinder, and carries at its lower end a flange $C^2$. Around this flange are spaced holes $C^3$ which are threaded for engagement by a fastening device in the form of a screw $C^4$ extending from the outer end of the socket B, thereby to lock the sleeve to the socket B at any desired fraction of a turn as determined by the number of holes $C^3$ employed. This sleeve C during assembly, is screwed on to the cylinder from within the crankcase and preferably is held in position by the screw $C^4$, and the cylinder is screwed into it until its inner end abuts a stop in the form of a shoulder $A^5$ at the end of the threaded part $A^4$ of the cylinder, the axial load being designed to be taken by the flange $C^2$ which bears against the inner end of the socket B inside of the crankcase. Alternatively the sleeve can first be located in position in the socket and be there held by the screw $C^4$ while the cylinder A is screwed into it.

To provide an abutment which in conjunction with the flange $C^2$ of the sleeve C will grip the cylinder to the crankcase so that it can neither turn angularly nor move endwise in the socket, there is employed a contractile wedge ring in the form of a double conical split ring D (that is, a ring of truncated wedge section) which is tightened by a tangentially arranged bolt $D^2$ and is located between the two bevelled faces $A^3$ and $B^2$ above mentioned. The cylinder can thus be adjusted vertically, that is by reference to the axis of the crankshaft (as a prescribed height within narrow limits must be reached in conjunction with a prescribed angular position) by rotating the sleeve C in the crankcase to the requisite extent, and securing it afterwards by the engagement of a locking screw $C^4$ with one of the series of holes $C^3$ formed around the flange $C^2$.

If, however, when the sleeve C is screwed hard against the abutment $A^5$, and the screw $C^4$, is engaged with one of the holes $C^3$ in the sleeve flange $C^2$, the correct angular position of the cylinder is not obtained, the following procedure is adopted. The split ring D is slacked, the screw $C^4$ is disengaged from the sleeve C, and the cylinder is then rotated (in the direction which ensures the sleeve being maintained in contact with the abutment $A^5$, until it has been turned the least possible amount beyond its desired angular position which will bring a hole $C^3$ into position for engagement by the screw $C^4$. The sleeve is then locked in this position by the screw $C^4$, the cylinder is turned backwards by unscrewing it in the sleeve to the extent necessary to bring it to the correct angular position, when the split ring D is then clamped by its bolt $D^2$ and the cylinder thereby is firmly secured against angular or endwise movement in the socket of the crankcase. It will be seen that the foregoing arrangement permits of locating the axial position of the cylinder within the very narrow limits constituted by dividing the pitch of the threads at $A^4$ by the number of holes $C^3$ around the sleeve, it being understood that all the cylinders of a given engine have the shoulders $A^5$ accurately located upon them, and that the sleeves C are alike, as well as the distances of the inner end faces of the socket B from the axis of the crankshaft of the engine. Furthermore, it will be obvious that by suitably inclining the bevelled faces $A^3$, $B^2$, above mentioned, and also the bevelled sides of the ring D which engage them, the later, when firmly clamped by its bolt $D^2$, is adapted to take up the full extent of the linear distance which may be occasioned between the shoulder $A^5$ and the end of the sleeve C in making the angular adjustment of the cylinder just described.

No spanner need be used in the foregoing adjustments, as before making the final adjustments, the sleeve C initially may be held in position by engagement of the screw $C^4$ with either of the holes $C^3$ while the cylinder is screwed into it by hand.

What I claim as my invention and desire to secure by Letters Patent of the United States is:—

1. In an internal combustion engine, the combination of a cylinder, a supporting member for said cylinder, a socket in said supporting member through which said cylinder extends, a sleeve, screw theaded upon said cylinder adapted to engage one end of said socket and to abut a stop upon said cylinder, a shoulder around said cylinder facing the end of said socket remote from the aforesaid screw-threaded sleeve, and a contractile wedge-ring adapted to fit between said shoulder and the adjacent end of said socket.

2. In an internal combustion engine, the combination of a cylinder, a supporting member for said cylinder, a socket in said supporting member through which said cylinder extends, a sleeve screw-threaded upon said cylinder to abut a stop thereon and to extend into said socket, a flange formed on said sleeve to abut one end of said socket, holes spaced around said flange for engagement selectively by a fastener adapted to secure said sleeve to said cylinder support against axial and endwise movement, a shoulder around said cylinder facing the end of said socket remote from that against which said sleeve bears, and a contractile wedge-ring adapted to fit between said shoulder and the adjacent end of said socket.

3. In an internal combustion engine, the combination of a cylinder, a supporting member for said cylinder, a socket in said supporting member through which said cylinder extends, a sleeve screw-threaded upon said cylinder to abut a stop thereon and to extend into said socket, a flange formed on said sleeve to abut one end of said socket, holes spaced around said flange for engagement selectively by a fastener adapted to secure said sleeve to said cylinder support against axial and endwise movement, a coned shoulder around said cylinder facing the end of said socket, the apex of the cone towards the socket, a split contractile wedge ring adapted to fit between said coned shoulder and the adjacent end of said socket, thereby when contracted to tend to thrust the cylinder out of the socket, and a fastener engaging the split ends of said contractile ring adapted to draw them together.

In testimony whereof I have signed my name to this specification in the presence of two subscribing witnesses.

S. M. VIALE.

Witnesses:
A. J. MASTER,
ERIC W. WALFORD.